United States Patent [19]

Zhou et al.

[11] Patent Number: 5,796,858
[45] Date of Patent: Aug. 18, 1998

[54] FINGERPRINT SENSING SYSTEM USING A SHEET PRISM

[75] Inventors: Gan Zhou, Pasadena; Yong Qiao, Alhambra; Fai Mok, West Hills, all of Calif.

[73] Assignee: Digital Persona, Inc., Redwood City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 646,531

[22] Filed: May 10, 1996

[51] Int. Cl.⁶ .................. G06K 9/00; G06K 9/74
[52] U.S. Cl. .................. 382/127; 382/124; 356/71; 902/5; 235/382; 340/825.34
[58] Field of Search .................. 382/124, 126–127, 382/115; 356/71; 340/825.31, 825.34; 359/831; 235/382; 902/5; 348/156, 161

[56] References Cited

U.S. PATENT DOCUMENTS

| | | | |
|---|---|---|---|
| 3,419,287 | 12/1968 | Rudie | 283/7 |
| 3,872,438 | 3/1975 | Suttill et al. | 340/7 |
| 4,047,154 | 9/1977 | Vitols et al. | 340/146.3 |
| 4,151,512 | 4/1979 | Riganati et al. | 340/146.3 |
| 4,156,230 | 5/1979 | Riganati et al. | 340/146.3 |
| 4,185,270 | 1/1980 | Fischer, II et al. | 340/146.3 |
| 4,208,651 | 6/1980 | McMahon | 340/146.3 |
| 4,210,899 | 7/1980 | Swonger et al. | 340/146.3 |
| 4,225,850 | 9/1980 | Chang et al. | 340/146.3 |

(List continued on next page.)

FOREIGN PATENT DOCUMENTS

| | | | |
|---|---|---|---|
| 0159037 | 10/1985 | European Pat. Off. | G07C 9/00 |
| 4125198 | 5/1992 | Germany | G06K 19/073 |
| 5089234 | 8/1993 | Japan | G07D 9/00 |
| 1283748 | 8/1972 | United Kingdom | G07D 9/00 |
| 8203286 | 9/1982 | WIPO | G07C 11/00 |
| 9107728 | 5/1991 | WIPO | G06K 9/00 |

OTHER PUBLICATIONS

"3M™ *Image Directing Film (IDF) II Sending Light off in the right direction*", 3M Electronic Display Lighting, literature sales.

"3M™ *Transmissive Right Angle Film (TRAF) II*", *All the right angles to do two jobs*, 3M Electronic Display Lightning, literature sales.

"3M™ *Brightness Enhancement Film (BEF) II*", 3M, Electronic Display Lighting.

(List continued on next page.)

*Primary Examiner*—Leo H. Boudreau
*Assistant Examiner*—Bhavesh Mehta
*Attorney, Agent, or Firm*—Blakely, Sokoloff, Taylor & Zafman, LLP

[57] ABSTRACT

In one embodiment, a fingerprint sensing system includes a sheet prism having a sensing surface and a number of prismlets positioned opposite to the sensing surface. Each prismlet has an entrance surface and an exit surface, and is adjacent to another prismlet. The width of the sheet is more than ten times the maximum thickness of any one of the prismlets. When a finger is positioned on the sensing surface, a portion of the radiation entering a number of the entrance surfaces and incident at the sensing surface is reflected through total internal reflection. The reflected radiation emits from a number of the exit surfaces to create an image of the fingerprint. In another embodiment, the system further includes a second sheet prism stacked together with the previously described sheet prism. The second sheet prism has a flat surface and a number of prismlets positioned opposite to the flat surface, which faces the prismlets of the previously described sheet prism. The image formed with two sheet prisms can have lower distortion. In yet another embodiment, the fingerprint sensing system is incorporated into a flat-profile package using mirrors to fold radiation and to compress the height of the package.

28 Claims, 10 Drawing Sheets

U.S. PATENT DOCUMENTS

| | | | |
|---|---|---|---|
| 4,253,086 | 2/1981 | Szwarcbier | 340/146.3 |
| 4,260,979 | 4/1981 | Smith | 340/146.3 |
| 4,414,684 | 11/1983 | Blonder | 382/4 |
| 4,449,189 | 5/1984 | Feix et al. | 364/513.5 |
| 4,454,610 | 6/1984 | Sziklai | 382/3 |
| 4,525,859 | 7/1985 | Bowles et al. | 382/5 |
| 4,581,760 | 4/1986 | Schiller et al. | 382/4 |
| 4,607,384 | 8/1986 | Brooks | 382/4 |
| 4,618,988 | 10/1986 | Schiller | 382/5 |
| 4,636,622 | 1/1987 | Clark | 235/380 |
| 4,641,350 | 2/1987 | Bunn | 382/4 |
| 4,646,352 | 2/1987 | Asai et al. | 382/5 |
| 4,685,145 | 8/1987 | Schiller | 382/52 |
| 4,696,046 | 9/1987 | Schiller | 382/5 |
| 4,698,751 | 10/1987 | Parvin | 364/200 |
| 4,723,298 | 2/1988 | Schiller | 382/56 |
| 4,747,147 | 5/1988 | Sparrow | 382/4 |
| 4,752,966 | 6/1988 | Schiller | 382/5 |
| 4,777,651 | 10/1988 | McCann et al. | 382/21 |
| 4,787,742 | 11/1988 | Schiller et al. | 356/71 |
| 4,790,564 | 12/1988 | Larcher et al. | 283/69 |
| 4,805,223 | 2/1989 | Denyer | 382/4 |
| 4,811,414 | 3/1989 | Fishbine et al. | 382/52 |
| 4,817,183 | 3/1989 | Sparrow | 382/4 |
| 4,827,527 | 5/1989 | Morita et al. | 382/4 |
| 4,837,843 | 6/1989 | Owechko | 382/31 |
| 4,876,726 | 10/1989 | Capello et al. | 382/4 |
| 4,891,503 | 1/1990 | Jewell | 235/380 |
| 4,896,363 | 1/1990 | Taylor et al. | 382/5 |
| 4,906,070 | 3/1990 | Cobb, Jr. | 350/286 |
| 4,933,976 | 6/1990 | Fishbine et al. | 382/4 |
| 4,944,021 | 7/1990 | Hoshino et al. | 382/5 |
| 4,947,442 | 8/1990 | Tanaka | 382/5 |
| 4,947,443 | 8/1990 | Costello | 382/5 |
| 4,956,870 | 9/1990 | Hara | 382/30 |
| 4,993,068 | 2/1991 | Piosenka et al. | 380/23 |
| 4,995,086 | 2/1991 | Lilley et al. | 382/4 |
| 5,040,223 | 8/1991 | Kamiya et al. | 382/4 |
| 5,040,224 | 8/1991 | Hara | 382/4 |
| 5,050,220 | 9/1991 | Marsh et al. | 382/4 |
| 5,050,222 | 9/1991 | Lee | 382/21 |
| 5,053,608 | 10/1991 | Senanayake | 235/380 |
| 5,054,090 | 10/1991 | Knight et al. | 382/4 |
| 5,056,892 | 10/1991 | Cobb, Jr. | 359/831 |
| 5,067,162 | 11/1991 | Driscoll, Jr. et al. | 382/5 |
| 5,095,194 | 3/1992 | Barbanell | 235/379 |
| 5,101,436 | 3/1992 | DeAgular et al. | 382/1 |
| 5,105,467 | 4/1992 | Kim et al. | 382/4 |
| 5,109,428 | 4/1992 | Igaki et al. | 382/5 |
| 5,144,680 | 9/1992 | Kobayashi et al. | 382/4 |
| 5,175,593 | 12/1992 | Kumagai et al. | 356/71 |
| 5,187,747 | 2/1993 | Capello | 382/4 |
| 5,187,748 | 2/1993 | Lee | 382/4 |
| 5,222,152 | 6/1993 | Fishbine et al. | 382/2 |
| 5,222,153 | 6/1993 | Beiswenger | 382/4 |
| 5,239,590 | 8/1993 | Yamamoto | 382/4 |
| 5,402,324 | 3/1995 | Yokoyama et al. | 359/49 |
| 5,448,649 | 9/1995 | Chen et al. | 382/126 |
| 5,448,659 | 9/1995 | Tsutsui et al. | 385/14 |
| 5,467,403 | 11/1995 | Fishbine et al. | 382/116 |
| 5,513,272 | 4/1996 | Bogosian, Jr. | 382/116 |
| 5,522,623 | 6/1996 | Soules et al. | 283/91 |
| 5,530,757 | 6/1996 | Krawczyk | 380/23 |
| 5,563,345 | 10/1996 | Kersten et al. | 73/602 |
| 5,572,597 | 11/1996 | Chang et al. | 382/125 |
| 5,613,012 | 3/1997 | Hoffman et al. | 382/115 |
| 5,619,586 | 4/1997 | Sibbald | 382/127 |
| 5,623,552 | 4/1997 | Lane | 382/124 |
| 5,625,448 | 4/1997 | Ranalli et al. | 356/71 |
| 5,644,645 | 7/1997 | Osuga | 382/124 |
| 5,668,603 | 9/1997 | Copeland | 348/473 |
| 5,680,205 | 10/1997 | Borza | 356/71 |

OTHER PUBLICATIONS

"3M™ *Brightness Enhancement Film (BEF) II*", 3M, A brilliant solution for improved backlight efficiency. Electronic Display Lighting, literature sales.

"Real–time Fingerprint Sensor Using a Hologram" by Igaki et al., Applied Optics, vol. 31, No. 11, 10 Apr., 1992, pp. 1794–1802.

FINGERPRINT SENSING SYSTEM USING A SHEET PRISM

BACKGROUND OF THE INVENTION

The present invention relates generally to sensing systems and more particularly to fingerprint sensing systems.

Figure 1:
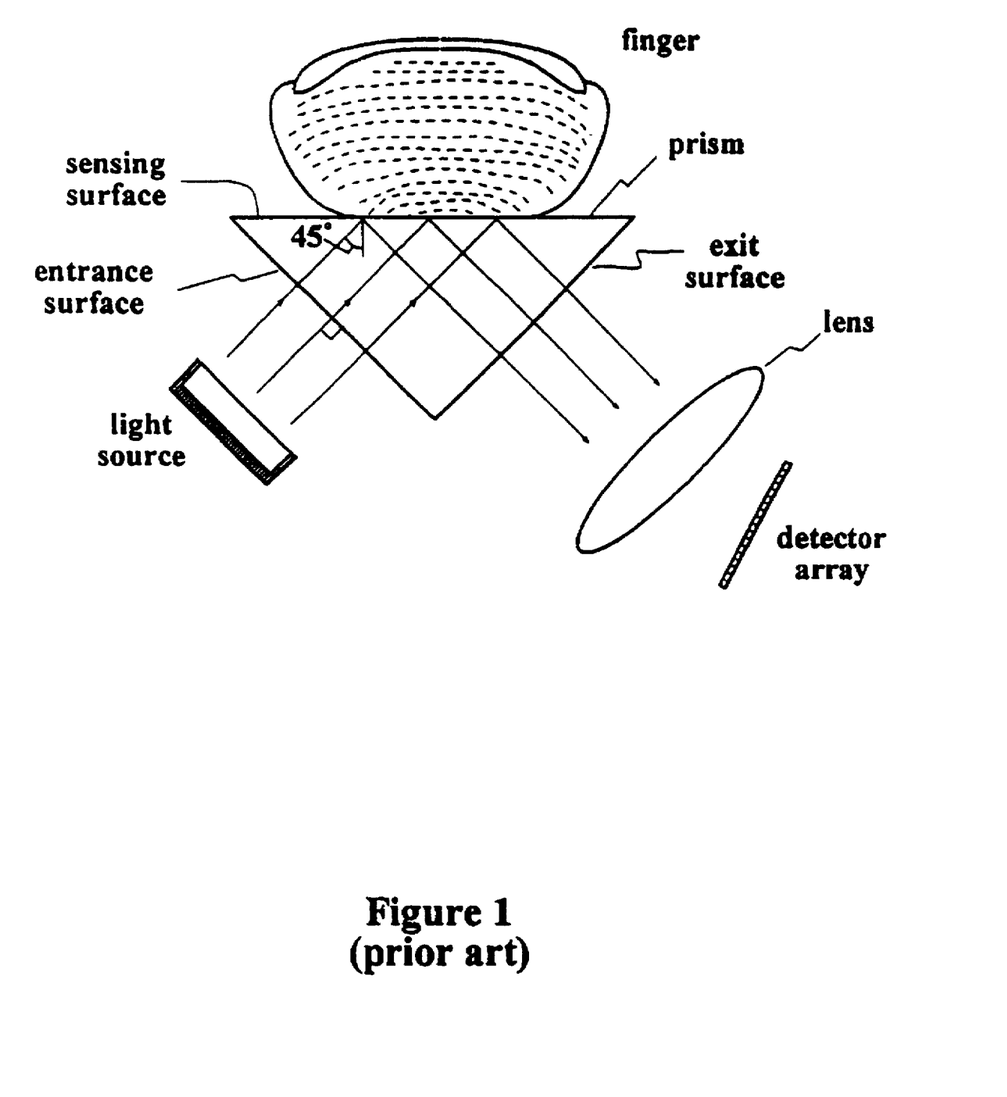
FIG. 1 shows a prior art fingerprint sensing system using a bulky single prism.

FIG. 1 shows a prior art fingerprint sensing system using a single prism with three functional surfaces—the sensing surface, the entrance surface and the exit surface. A finger is placed on the sensing surface of the prism. An extended light source provides illumination for the entrance surface. The angle of incidence at the entrance surface is typically at about 90 degrees, and the angle of incidence at the sensing surface is about 45 degrees, which is larger than the critical angle of the prism. One portion of the incident radiation at the sensing surface is reflected through total internal reflection, and another portion is not. Where ridges on the finger are in contact with the sensing surface, light will be transmitted into or absorbed by the finger. On the other hand, where there are grooves on the finger, contacts are not made with the sensing surface, and the incident light is reflected from the sensing surface through total internal reflection. The reflected light emits from the exit surface and is focused by a lens to create a fingerprint image, which is dark where there are ridges and bright where there are grooves or where the finger is not in contact with the sensing surface. The lens focuses the fingerprint light pattern onto an electronic detector array, such as a CCD camera.

The single prism system creates a good image of a fingerprint. Unfortunately, it is not applicable to many applications. For example, if the system is for replacing a mechanical key for a door, the system is best mounted inside the door. For such an application, in order to fit within the wooden surface of the door, the system has to be very thin and flat. Due to the bulkiness of the prism, the single prism system occupies too much space.

It should be apparent from the foregoing that there is still a need for a fingerprint sensing system that is of similar accuracy as the single prism system, but does not occupy as much space.

SUMMARY

The present invention provides a fingerprint sensing system that is of similar accuracy as the single prism system, but it does not occupy as much space, and is cheaper. Instead of depending on a single bulky prism, the present invention employs a sheet prism with numerous prismlets or very small prisms. The sheet prism is different from the prior art single bulk prism; it is very flat, with the width of the sheet being more than ten times the maximum thickness of any one of the prismlets. With the bulky single prism replaced by the sheet prism, the overall thickness of the fingerprint sensing system is significantly reduced. In addition, the cost of the system is reduced because typically, the sheet prism is cheaper than the bulky single prism.

In one embodiment, structurally, the sheet prism includes a sensing surface, and a number of prismlets positioned opposite to the sensing surface. Each prismlet has an entrance surface and an exit surface, and each prismlet is adjacent to another prismlet. Functionally, when a finger is positioned on the sensing surface, a portion of the illumination radiation illuminating the system, entering through a number of entrance surfaces and incident at the sensing surface is reflected through total internal reflection at the sensing surface. The reflected radiation emits from a number of the exit surfaces to create a fingerprint image.

In another embodiment, the fingerprint sensing system includes a second sheet prism stacked together with the above described sheet prism, whose prismlets face the flat surface of the second sheet prism. Each prismlet of the second sheet has an exit surface. The system also includes a lens to focus the radiation emitted from a number of the exit surfaces of the second prism to form the image, whose distortion is reduced due to the second sheet prism.

In a third embodiment, the fingerprint sensing system with one sheet prism is incorporated into a flat-profile package using mirrors to fold radiation and to compress the height of the package. The fingerprint sensing system made occupies a box that is about 24 mm high, 61 mm wide and 73 mm long, which is significantly flatter and about ten times smaller than commercially available systems.

Other aspects and advantages of the present invention will become apparent from the following detailed description, which, when taken in conjunction with the accompanying drawings, illustrates by way of example the principles of the invention.

Same numerals in FIGS. 1–9 are assigned to similar elements in all the figures. Embodiments of the invention are discussed below with reference to FIGS. 1–9. However, those skilled in the art will readily appreciate that the detailed description given herein with respect to these figures is for explanatory purposes as the invention extends beyond these limited embodiments.

DETAILED DESCRIPTION OF THE INVENTION

Figure 2A:
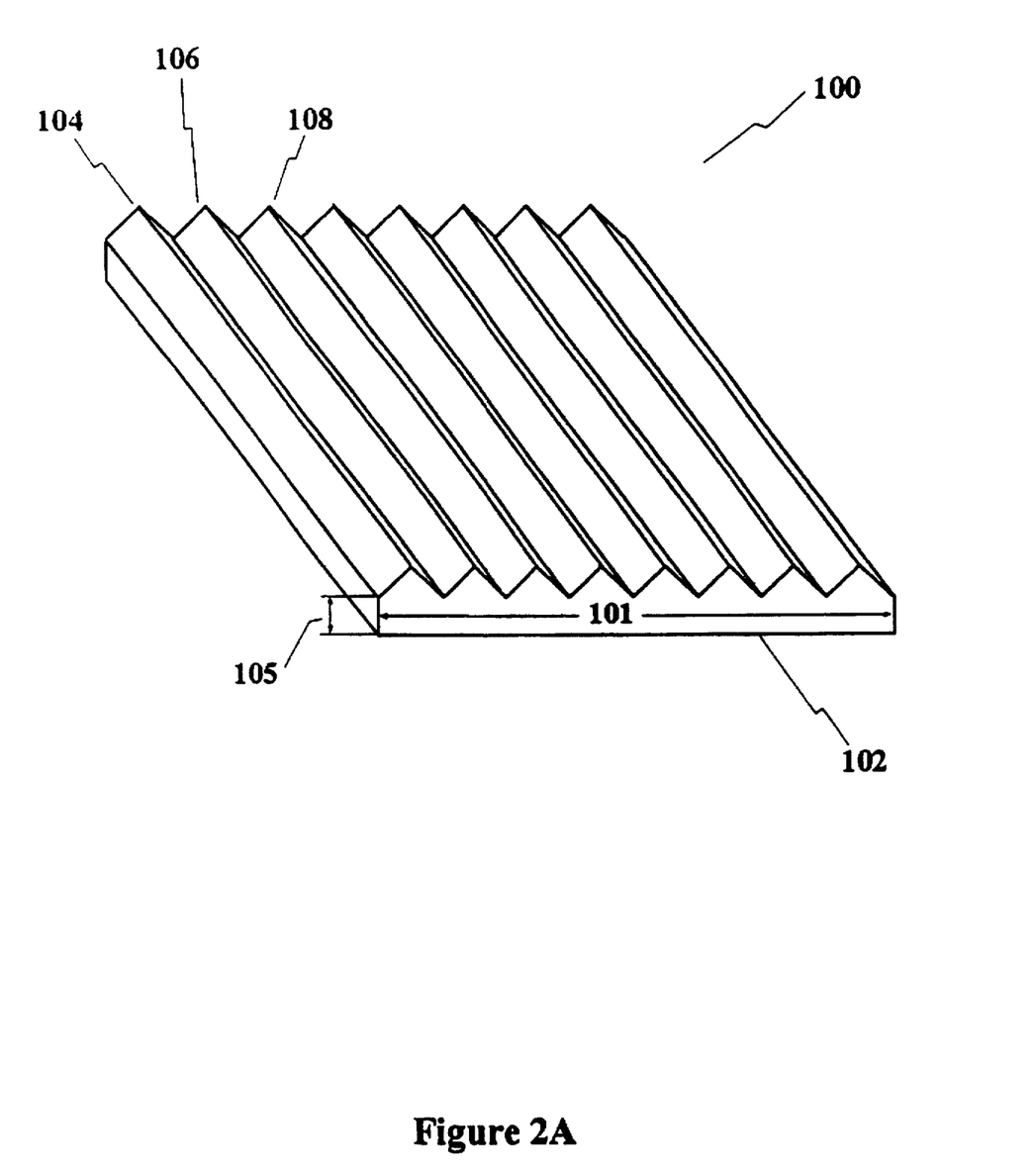
FIGS. 2A–B show an example of a sheet prism for the present invention.

FIG. 2A shows an example of a sheet prism 100 for the present invention. It includes a sensing surface 102 and numerous prismlets, such as 104, 106 and 108, disposed on the opposite side of the sensing surface 102. The sensing surface includes a width 101.

Figure 2B:
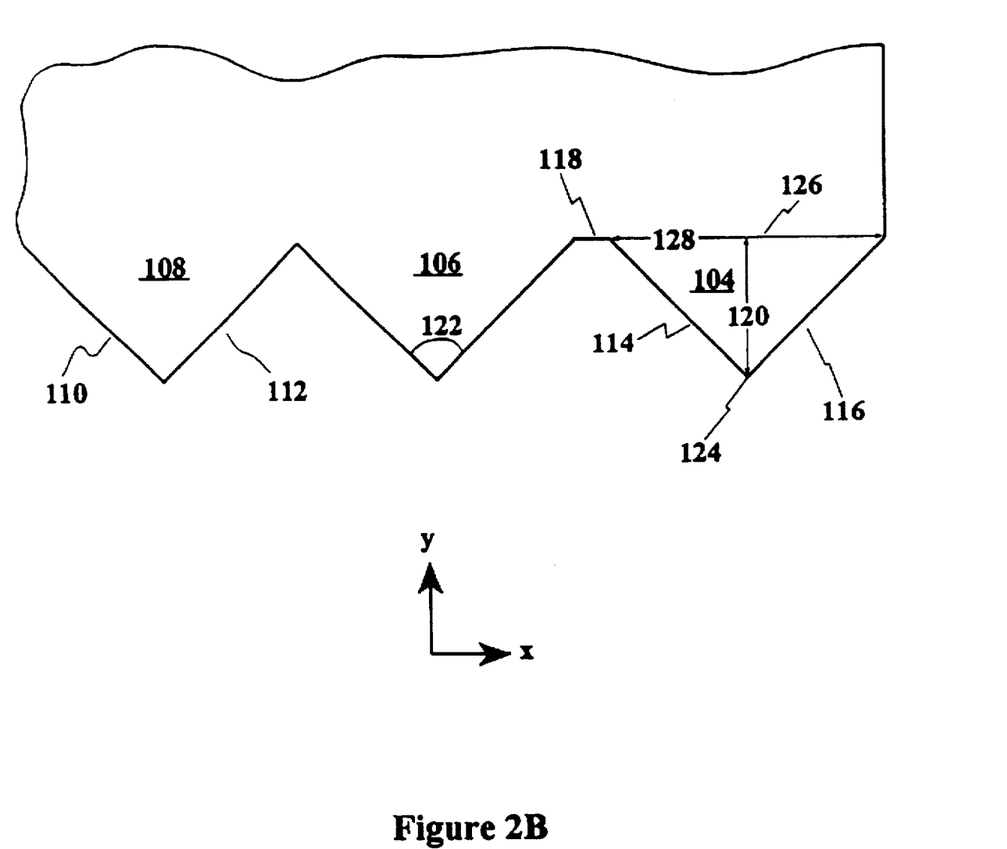

FIG. 2B shows a cross-sectional view of the three prismlets, 104, 106, 108. Each prismlet includes an entrance surface and an exit surface, such as 110 and 112 respectively. The entrance surface and the exit surface of each prismlet subtends a prism angle, such as 122. Each prismlet has a maximum thickness, which is defined to be the distance between the apex and the base of the prismlet, such as the distance 120 between the apex 124 and the base 126 of the prismlet 104. In one embodiment, in dimension, the width of the sensing surface is more than ten times the maximum thickness of any prismlet in the sheet prism 100. The prism angle can cover a wide range, such as approximately between 80 to 100 degrees, and the dimension of each entrance surface is substantially the same as the dimension of each exit surface.

The prismlets are adjacent to each other. In the present invention, two prismlets are considered as adjacent to each other if there is no extra prismlet in between. There can be a gap between the two prismlets, such as the gap 118; however, the width of the gap is less than at least one-half the width of the prismlet next to the gap, such as the width of the gap 118 being significantly less than the width 128.

In one embodiment, the orientations of the entrance surfaces are similar to each other and the orientations of the exit surfaces are similar to each other. Similar is defined as being within 20 degrees of 45 degrees from the Y-axis for the exit surfaces, and within 20 degrees of −45 degrees from the Y-axis for the entrance surfaces. In another embodiment, the orientations of the entrance surfaces of all of the prismlets are substantially the same, and the orientation of the exit surfaces are substantially the same—substantially the same is defined as being differed by less than five degrees, such as one being 42 degrees from the Y-axis, and the other being 40 degrees. In yet another embodiment, the orientation of at least one of the entrance surfaces is intentionally made to be different from others, and the orientation of at least one of the exit surfaces is intentionally made to be different from others. Any differences in orientations of the surfaces lead to distortion in the fingerprint image, and the distortion depends on the amount of differences.

Note that at the base, the prismlets are integral with a slab of the same material, which has a thickness 105, and which provides mechanical support for the prismlets. In another embodiment, the prismlets with its slab is laminated on a glass substrate, or another type of transparent substrate to provide additional mechanical strength for the sheet prism; in this embodiment, the "slab" includes the glass substrate, and the surface of the glass substrate opposite to its laminating surface becomes the sensing surface.

One embodiment of the sheet prism is fabricated by plastic molding. The cost of molding a plastic device is a function of time needed for the plastic device to cool down. Although the bulk prism can also be made by plastic molding, its bulkiness significantly increases the amount of time required for the molding to cool down. Thus, molding bulk prism is much more expensive than molding a sheet prism.

Figure 3:
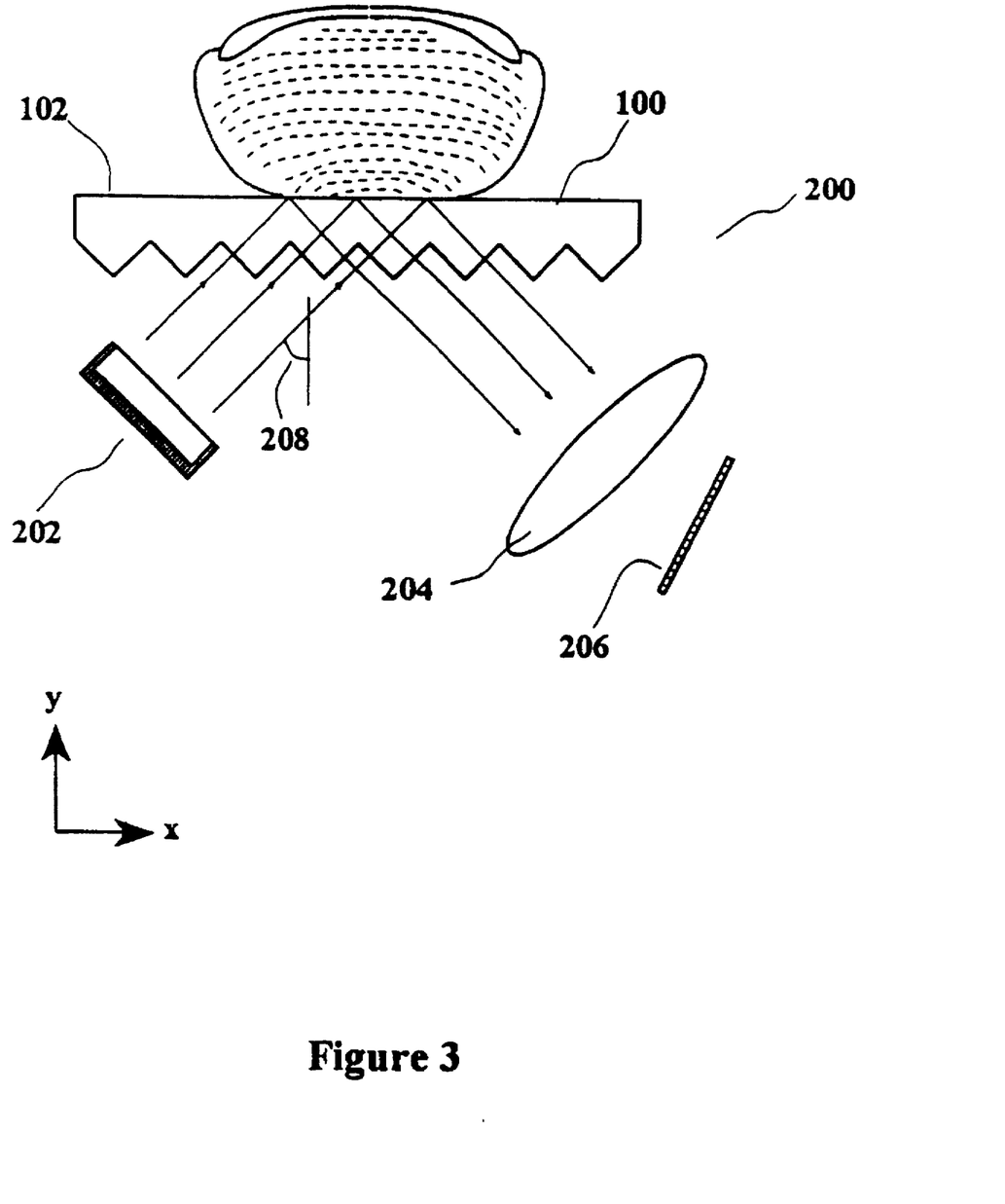
FIG. 3 shows an embodiment of the present invention with one sheet prism.

FIG. 3 shows a first embodiment 200 of the present invention with the sheet prism 100.

A finger is placed on the sensing surface 102, which is parallel to the X-axis. An extended light source 202 provides the illumination radiation for the sheet prism 100. The illumination angle 208, which is the angle between the illumination radiation and the Y-axis, is such that the radiation reaching the sensing surface 102 has an incident angle larger than the critical angle of the material of the sheet prism 100 and less than 90 degrees. This ensures the incident radiation is being total internally reflected at the sensing surface 102 at locations without the finger ridges. Thus, a portion of the illumination radiation entering a number of the entrance surfaces and incident at the sensing surface 102 is reflected through total internal reflection. The reflected radiation emits from a number of the exit surfaces to create the fingerprint image. Note that the sheet prism attenuates the radiation, but the loss is lower than the bulky single prism because the sheet prism is much thinner.

In one embodiment, substantially the entire sensing surface is illuminated by the illumination radiation. In the present invention, "substantially the entire sensing surface" means at least 50% of the sensing surface. In another embodiment, the angle of incidence is approximately 45 degrees at the sensing surface 102. The orientation of the entrance surfaces is approximately −45 degrees from the Y-axis. Thus, the angle of incidence of the illumination radiation on the entrance surfaces is about 90 degrees.

Substantial amount of the total-internally reflected radiation emits from a number of the exit surfaces to create the fingerprint image. The emitted radiation is focused by a lens 204 onto a detector array 206.

Typically, both the size of the finger and the size of the sensing surface are larger than the size of the detector array. This is because a smaller array is cheaper. Thus, the lens 204 also serves the function of de-magnification by having the object distance—the distance from the sensing surface 102 to the lens 204—to be larger than the image distance—the distance from the lens 204 to the detector 206.

Figure 4:
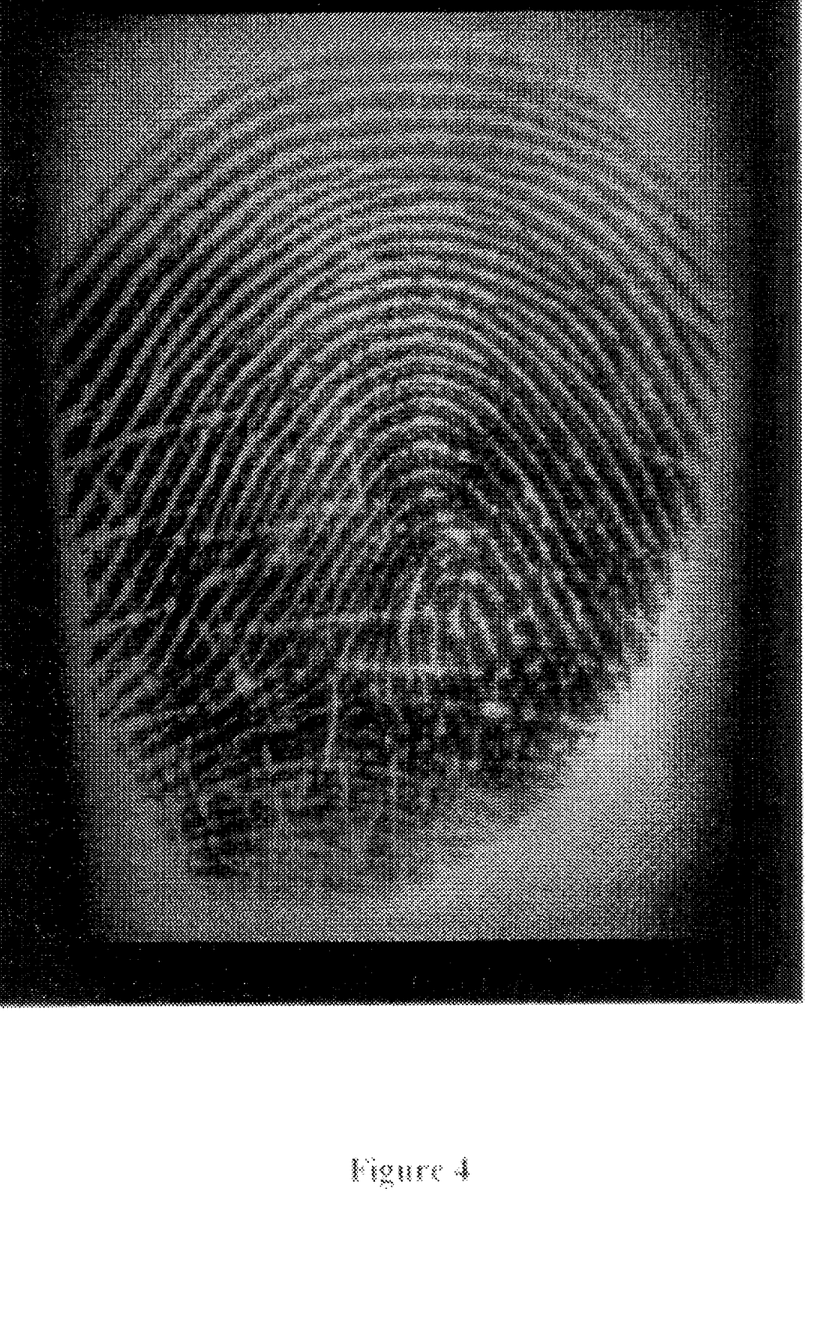
FIG. 4 shows an image of a fingerprint produced by one example of the embodiment shown in FIG. 3.

FIG. 4 shows an image of a fingerprint produced by one example of the embodiment shown in FIG. 3.

Figure 5A:
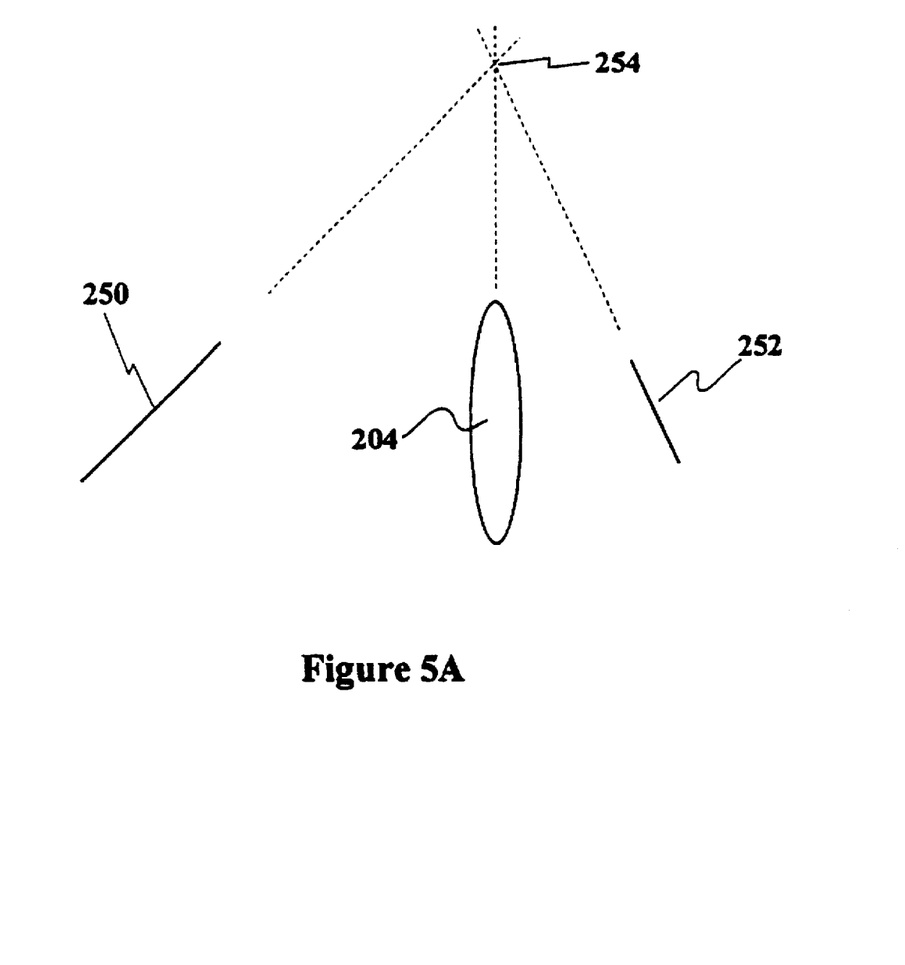
FIGS. 5A–B show distortion in an image of an object, if the object plane is not perpendicular to the optical axis of a lens.

In one embodiment, with the emitted radiation reflected from the sensing surface at a reflection angle larger than the critical angle, such as 45 degree, imaging using off-the-shelf lens with the sensing surface parallel to the plane of the lens results in excessive aberrations. To reduce aberrations, as shown in FIG. 5A, the lens is tilted so that the sensing surface and the image plane intersect each other at the plane of the lens—a condition known as the Scheimpflug condition. A detailed discussion on the Scheimpflug condition can be found in *Modern Optical Engineering*, 2nd Edition, written by Warren J. Smith, and published by McGraw-Hill in 1990.

Figure 5B:
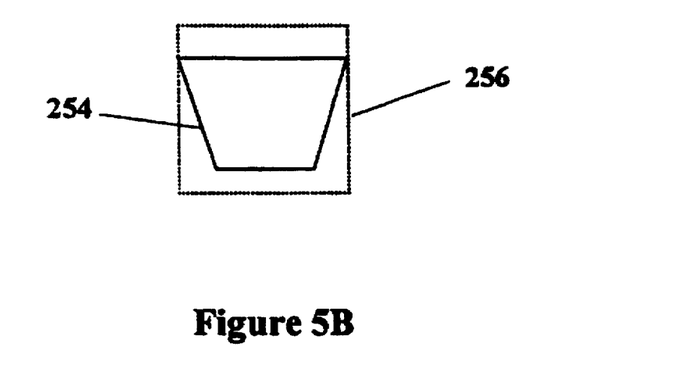

In our example, the object plane 250 is the sensing surface 102; and the image plane is the plane at the surface of the detector array 206. Under such an imaging condition, the image is slightly distorted. This is due to a number of reasons. First, with the object plane 250 slanted, a projected view rather than the normal view of the object is imaged. As a result, the image is compressed. Second, one end of the object plane 250 is closer to the lens 204 than another end. As a result, an ideal image 256 of a square may have the shape of a trapezoid, 254, as shown in FIG. 5B.

Figure 6:
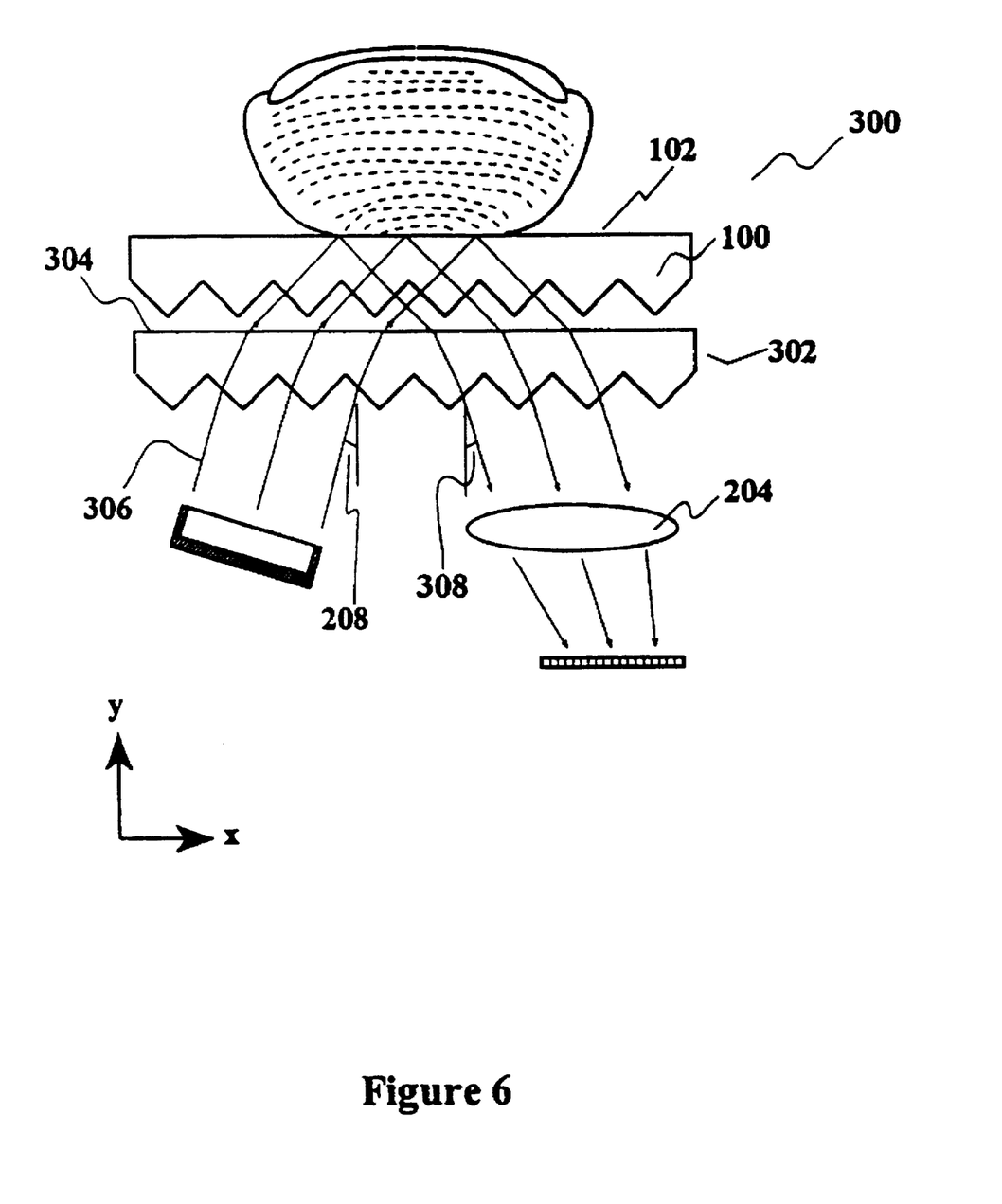
FIG. 6 shows an embodiment of the present invention with two sheet prisms.

FIG. 6 shows a second embodiment 300 of the present invention that can significantly reduce the above described distortion in a fingerprint image. The basic idea is to bend the emitted radiation so that the optical axis of the lens is substantially perpendicular to the sensing surface 102, and the aberration is maintained low. This embodiment uses a second sheet prism 302 stacked together with the first sheet prism 100 just described. The second sheet prism 302 is similar to the first sheet prism 100. It also has a flat surface 304 and a number of prismlets positioned opposite to the flat surface 304, which faces the prismlets of the first sheet prism 100.

The second sheet prism 302 does not have to be exactly the same as the first sheet prism 100. Again, for the second sheet prism 302, each prismlet has an entrance surface and an exit surface. The orientations of the entrance surfaces is such that the illumination radiation 306 is incident on the flat surface 304 at an incident angle less than the critical angle of the material of the second sheet prism 302. Also, the radiation emerges from the sheet prism 302 illuminates the sheet prism 100 at the appropriate angle so as to ensure total internal reflection at the sensing surface 102. With such limitations, substantial amount of the illumination radiation from the second prism 302 propagates to the first prism 100 to substantially illuminate the entire sensing surface 102. Again, "substantially illuminate the entire sensing surface" means at least 50% of the sensing surface has been illuminated. Also, a substantial portion of the total-internally reflected radiation emits from the first sheet prism 100 into the second sheet prism 302, and then emits from a number of the exit surfaces of the second sheet prism 302 to create the image of the fingerprint.

For the second sheet prism 302, in one embodiment, the flat surface 304 is parallel to the X-axis. The orientations of the entrance surfaces of the second sheet prism 302 are similar to each other, and the orientations of the exit surfaces are similar to each other. In another embodiment, the prism angle covers a wide range, such as approximately between 80 to 100 degrees, and the dimensions of each entrance surface is substantially the same as the dimensions of each exit surface. If the prism angle for both prism sheets is 90 degrees, and if the entrance surfaces and the exit surfaces are of substantially the same dimensions, the orientation of the illumination radiation covers the range from approximately 16 to 29 degrees from the Y-axis.

Comparing the emitted radiation towards the lens and the illumination radiation in FIG. 3 with those in FIG. 6, one can see that the prismlets in the second sheet has significantly "bent" the radiation in FIG. 6 towards the Y-axis. It has been found experimentally that with an average off-the-shelf lens for the lens 204, its aberration is acceptable even if its optical axis is perpendicular to the sensing surface 102 as long as the exit angle 308 of the emitted radiation is not much bigger than 20 degrees from the Y-axis.

Figure 7:
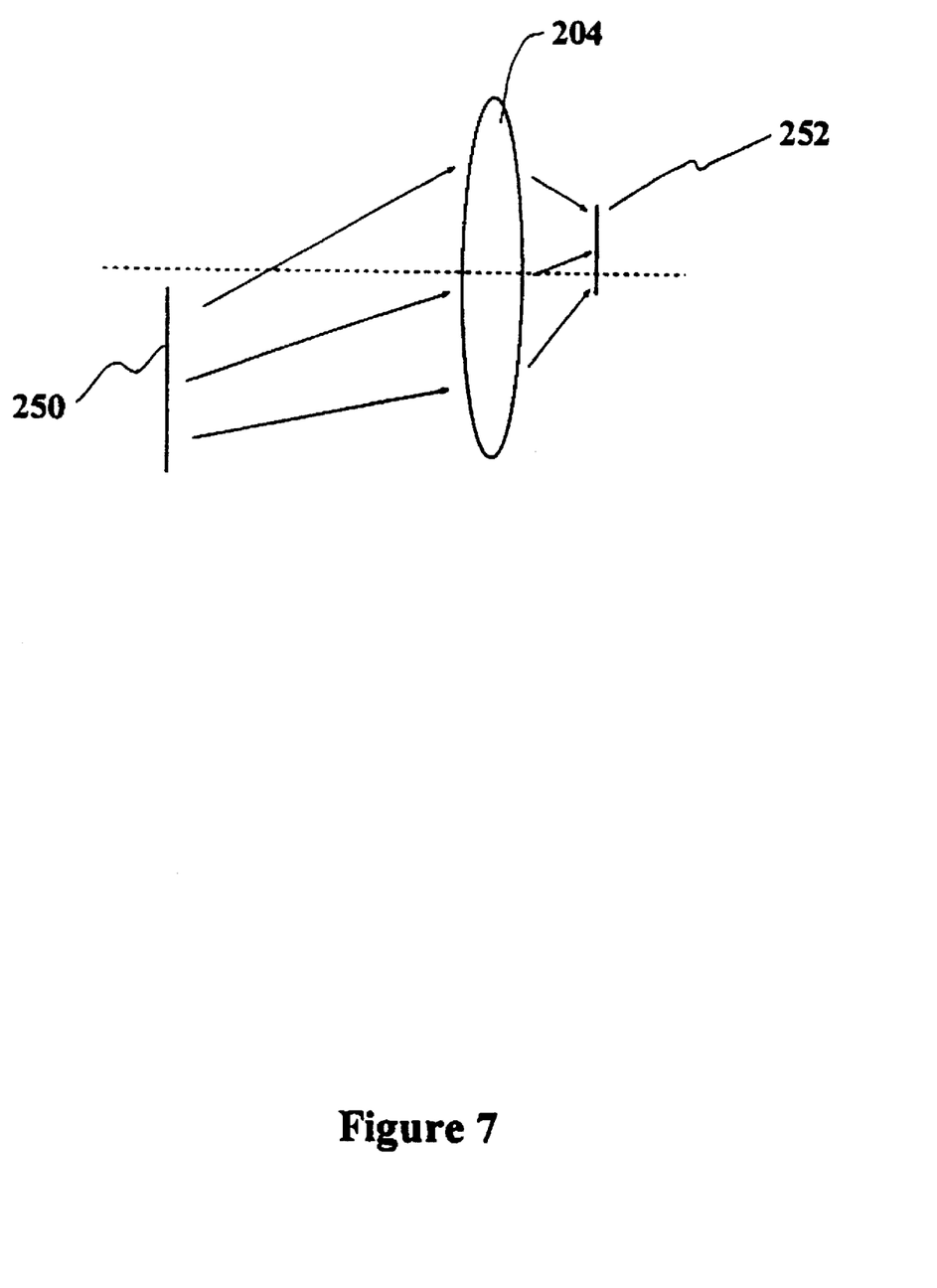
FIG. 7 shows the ray diagram for the lens in FIG. 6.

FIG. 7 shows the ray diagram of the lens in FIG. 6. Note that object plane 250 (or the sensing surface 102) is perpendicular to the optical axis of lens 204, and is parallel to the image plane 252. Such a configuration substantially reduces the distortion discussed above.

Figure 8:
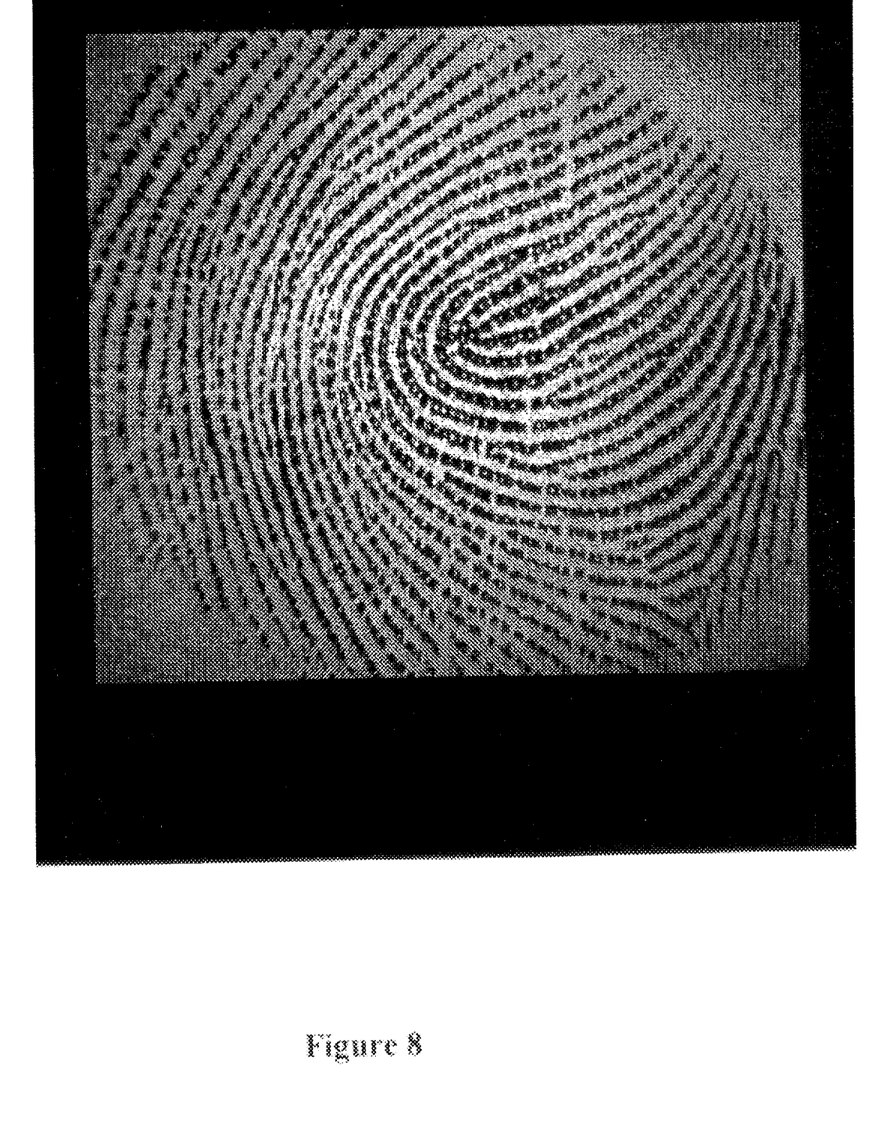
FIG. 8 shows an image of a fingerprint produced by one example of the embodiment shown in FIG. 6.

FIG. 8 shows an image of a fingerprint produced by one example of the embodiment shown in FIG. 6.

Figure 9:
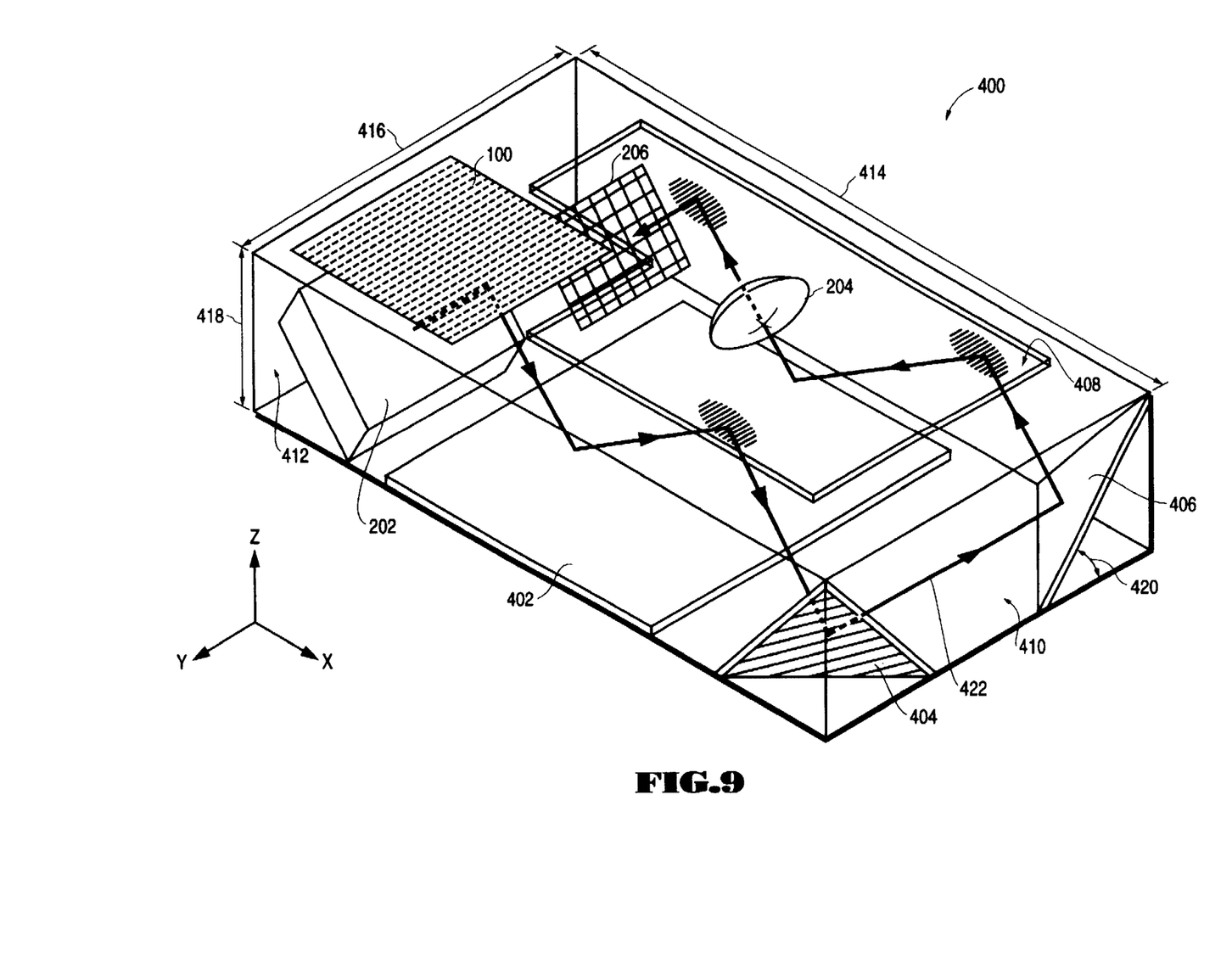
FIG. 9 shows an embodiment of a flat-profile package for the fingerprint sensing system of the present invention.

FIG. 9 shows a third embodiment 400 incorporating the first embodiment of the present invention in a flat-profile package. In the third embodiment, for each prismlet, the prism angle is between about 70 to 110 degrees, with the dimensions of its entrance surface substantially the same as that of the exit surface, and the sensing surface being along the X-axis. As an example, if the prism angle is 90 degrees, the orientation of the illumination radiation is about 40 to 57 degrees from the Y-axis.

The detector array is smaller than the sheet prism. The lens 204 focuses the radiation emitted from a number of the exit surfaces to the detector array 206, and de-magnifies the image to be captured by the detector array 206.

The system 400 has a maximum length 416, a maximum width 414 and a maximum height 418, and two end surfaces 410 and 412. The system also includes an optical system with mirrors to fold the radiation emitted from the exit surfaces so as to change the ratio between the maximum length and the maximum width of the system 400.

Two end mirrors, 404 and 406, in the optical system fold the emitted radiation. The two mirrors are located close to a first end 410 of the system 400. In one embodiment, each mirror is at one corner of the system. For both mirrors, the slanting angle 420—defined as the angle between the plane of each mirror and the bottom surface of the system 400— can be experimentally found to fold the emitted radiation back towards the detector array. The sheet prism 100 and the detector array 206 are located close to a second end 412 of the system 400. The emitted radiation from the sheet prism 100 propagates approximately from the second end 412 of the system to the first end 410 of the system. The radiation is directed to be incident on the mirror 404, which reflects it to the other mirror 406, which further reflects it back to the second end 412 of the system 400 to be received by the detector array 206.

The folding process changes one aspect ratio of the system 400. With the folding process, the length of the system 400 can be reduced by approximately one-half. There should be a certain distance between the sheet prism 100 and the lens 204 (the object distance), and between the lens 204 and the detector array 206 (the image distance), to achieve the desired de-magnification ratio. The folding process reduces the length of the system 400, but still maintains the object and the image distance.

In one embodiment, the system 400 is also flattened, which reduces the maximum height of the system 400. Note that in order to ensure the appropriate de-magnification ratio, the emitted radiation 422 should propagate a certain distance before reaching the lens 204. One way to achieve the distance requirement is to allow the emitted radiation 422 to continue to propagate along its path, as shown in FIG. 9, but for a much longer distance, and then fold the radiation back to be received. This requires the system to be quite thick. Another way is to include the top and the bottom mirrors, 408 and 402 respectively, in the optical system. The top and the bottom mirrors produce the extended path length without requiring a thick package. With those mirrors, the package is significantly flattened.

Working Examples

The invention will be further clarified by a consideration of the following examples, which are intended to be purely exemplary of using the invention.

For a working example of the embodiment shown in FIG. 3, the sheet prism is made of 3M's 90/50 Brightness Enhancement Film™ ("BEF"), with a width and length of 30 by 20 mm and having about 600 prismlets. For each prismlet, the prism angle is 90 degrees, and its entrance surface is almost the same as its exit surface. The maximum thickness of the substantially identical prismlets is 25 micrometers. The thickness of the slab of the BEF is 0.23 millimeter. It is laminated on a glass substrate that is 1 mm thick. The refractive index of BEF is approximately 1.58 and the refractive index of a glass substrate is approximately 1.50. The sensing surface is parallel to the X-axis.

Nine large area light emitting diodes provide the illumination radiation, with the illumination angle being 45 degrees from the Y-axis. The exit angle is also 45 degrees from the other side of the Y-axis. A 31 mm focal length aspheric lens is used as the lens for focusing and for approximately five times de-magnification. The detector array is a Watec 640 by 480 pixels CCD camera. The array is powered by a 12V DC power supply. The output of the array is a standard NTSC video signal. FIG. 4 shows a fingerprint obtained by such a system.

For the embodiment shown in FIG. 6, a working example includes two 3M sheet prisms. They are of the same size and shape and they are glued together at their edges. The illumination angle 208 is 19 degrees from the Y-axis. The radiation exits the flat surface of the second sheet prism at an angle of approximately 45 degrees from the Y-axis, leading to the illumination angle to the first sheet prism to be again 45 degrees from the Y-axis. The exit angle 308 from the second sheet prism is about 19 degrees from the Y-axis. FIG. 8 shows the fingerprint obtained by such a system.

The working example for the embodiment shown in FIG. 9 includes the working example for the embodiment shown in FIG. 3 with slight modification. This working example includes a sensing surface of 30 mm by 20 mm, an aspheric lens with a 18 mm focal length, a CCD camera with a detecting area of 3.6 mm by 4.8 mm, the minimum distance between the sensing surface and the bottom mirror being about 22 mm, and the two end mirrors at the first end of the system being experimentally adjusted to reduce the thickness of the embodiment, while folding the emitted radiation back to the detector array. The fingerprint sensing system made occupies a box that is 24 mm high, 61 mm wide and 73 mm long. In contrast, commercially available fingerprint sensing systems typically measure approximately 75 mm high, 125 mm wide and 175 mm long—more than 15 times bigger!

Conclusion

Different prismlets are applicable for the present invention. For example, with the sensing surface parallel to the X-axis for each prismlet, the orientation of each entrance surface can be within approximately −45 degrees ±20 degrees from the Y-axis, and the orientation of each exit surface can be within approximately 45 degrees ±20 degrees from the Y-axis. The dimension of each entrance surface does not have to be substantially the same as the dimension of each exit surface. For the embodiment shown in FIG. 3, the illumination angle 208 can be approximately (45±20) degrees from the Y-axis; and for the embodiment shown in FIG. 6, the illuminating angle can be approximately (19±10) degrees from the Y-axis. Fingerprint images can be generated by the above different values. However, some values create more distortion in the image, and some values create shadows leading to missing parts of the fingerprint in the image. Picking different values depend on the intent on using the present invention.

The present invention describes the illumination radiation substantially illuminating the entire sensing surface. Typically, the sensing surface is not much larger than the size of a finger. However, the present invention is applicable to the flat surface of a sheet prism being larger than its sensing area. In one embodiment, a certain area on the flat surface is identified to be the sensing surface, and a finger to be imaged should be positioned in that area. Again, the illumination radiation substantially illuminates the entire sensing surface.

In another embodiment, the third embodiment incorporates the second embodiment of the present invention, but with the mirrors at different positions.

A flat-profile fingerprint sensing system is ergonomic, aesthetically pleasing and convenient to use. In fact, many application required a flat and compact package. For example, a flat-profile compact fingerprint sensing system applying such as the first, second or third embodiment of the present invention, can be used as an authentication device to authenticate identity, or an identification device to resolve identity. The device can control a lock for a door to replace mechanical keys. The device can be in a computer to allow access to the computer, or to transmit information on one's identity through the computer to a network. Similarly, the device can be in a personal communication system, such as a telephone, a pager, a cellular phone, a fax machine, to allow access to the personal communication system or to transmit information on one's identity through the personal communication system. The device can be used to control access to a personal tool, such as for safety reasons. For example, the device can be incorporated in a chain-saw so that only the person who has the fingerprint matching a prestored fingerprint in the chain-saw can start the device. The device can be used to control access to a television or to one or more channels of the television, such as only certain people can access the adult channel. The device can also be in an automatic teller machine to verify the identity of its user. A flat-profile compact fingerprint sensing system, applying the first, second or third embodiment of the present invention, can also be used in a recording device. Whenever one is checking out a book from a library, or renting a CD from a video-rental shop, the device records the identity of its user. It should be obvious to those skilled in the different art, such as the art of telephone or chain-saw, to implement the present invention to those disciplines. Thus, the present disclosure will not further discuss the implementation process.

From the foregoing, it should be appreciated that a fingerprint sensing system has been invented that is smaller and cheaper than any commercially available system. Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A fingerprint sensing system comprising:
 a sheet prism having
  a sensing surface,
  a plurality of rigid prismlets positioned opposite to the sensing surface,
  each prismlet having an entrance surface and an exit surface,
  each prismlet being adjacent to another prismlet,
  the width of the sheet being more than ten times the maximum thickness of any one of the prismlets;
 such that when a finger is positioned on the sensing surface, a portion of illumination radiation illuminating the system, entering a plurality of the entrance surfaces and incident at the sensing surface is reflected through total internal reflection and emitted from a plurality of the exit surfaces to create an image of the fingerprint.

2. A fingerprint sensing system as recited in claim 1 wherein all of the entrance surfaces of the prismlets have similar orientation, and all of the exit surfaces of the prismlets have similar orientation.

3. A fingerprint sensing system as recited in claim 2 wherein the orientations of at least one of the entrance surfaces is made different from others, and the orientations of at least one of the exit surfaces is made different from others, so as to intentionally distort the image of the fingerprint.

4. A fingerprint sensing system as recited in claim 2 wherein the orientation of the entrance surfaces are substantially the same, and the orientations of the exit surfaces are substantially the same.

5. A fingerprint sensing system as recited in claim 1 further comprising a transparent substrate to enhance mechanical support for the sheet prism.

6. A fingerprint sensing system as recited in claim 1 wherein for each prismlet,
 the angle subtended by the entrance surface and the exit surface is substantially between 80 and 100 degrees; and the entrance surface is about the same dimension as the exit surface.

7. A fingerprint sensing system as recited in claim 6 wherein the angle subtended by the entrance surface and the exit surface is substantially 90 degrees.

8. A fingerprint sensing system as recited in claim 1 wherein substantially the entire sensing surface is illuminated by the illumination radiation.

9. A fingerprint sensing system as recited in claim 1 wherein substantial amount of the total-internally-reflected radiation emits from a number of the exit surfaces to create the image of the fingerprint.

10. A fingerprint sensing system as recited in claim 1 further comprising:
   a detector array; and
   a lens to focus the radiation emitted from a number of exit surfaces to the detector array to form the image.

11. A fingerprint sensing system as recited in claim 1 further comprising a second sheet prism stacked substantially in parallel with the sheet prism as recited in claim 1, the second sheet prism having a flat surface and a plurality of prismlets positioned opposite to the flat surface, the flat surface of the second sheet prism facing the prismlets of the sheet prism recited in claim 1.

12. A fingerprint sensing system as recited in claim 11 wherein:
   each prismlet in the second sheet has an exit surface; and
   the system further comprises:
      a lens to focus the radiation emitted from a number of the exit surfaces of the second sheet to form the image, whose distortion is reduced due to the second sheet prism.

13. A fingerprint sensing system as recited in claim 12 wherein the optical axis of the lens is substantially perpendicular to the sensing surface.

14. A fingerprint sensing system as recited in claim 1 wherein:
   the sensing system extends across a maximum length, a maximum width and a maximum height; and
   the system further comprises:
      a detector array, at least whose width is smaller than the width of the sheet prism;
      a lens to focus the radiation emitted from the exit surfaces to the detector array, and to de-magnify the image to be captured by the detector array; and
      an optical system with mirrors to fold the emitted radiation so as to change the ratio between the maximum length and maximum width of the sensing system.

15. A fingerprint sensing system as recited in claim 14 wherein for each prismlet,
   the angle subtended by the entrance surface and the exit surface is substantially between 85 and 95 degrees; and
   the entrance surface is about the same dimension as the exit surface.

16. A fingerprint sensing system as recited in claim 15 wherein:
   the sensing system has a first and a second end surfaces, with the sheet prism and the detector array located close to the first end surface; and
   the optical system includes two mirrors located close to the second end surface of the sensing system to fold the emitted radiation by receiving the emitted radiation from the sheet prism and reflecting it back to the detector array close to the first end surface.

17. A fingerprint sensing system as recited in claim 16 wherein:
   the sensing system includes a top and a bottom surface, with the sheet prism on the top surface; and
   the optical system further includes mirrors on both the top and the bottom surfaces to reflect the emitted radiation so as to reduce the maximum height of the system.

18. An authentication device comprising a fingerprint sensing system as recited in claim 1.

19. A lock comprising a fingerprint sensing system as recited in claim 1.

20. A computer comprising a fingerprint sensing system as recited in claim 1 to control access to the computer.

21. A computer comprising a fingerprint sensing system as recited in claim 1 such that information related to a fingerprint can be transmitted to a network.

22. A personal communication system comprising a fingerprint sensing system as recited in claim 1 to control access to the personal communication system.

23. A personal communication system comprising a fingerprint sensing system as recited in claim 1 such that information related to fingerprints can be transmitted through the personal communication system.

24. A personal tool comprising a fingerprint sensing system as recited in claim 1 so as to control access to the personal tool.

25. A television comprising a fingerprint sensing system as recited in claim 1 to allow control to a channel of the television.

26. An automatic teller machine comprising a fingerprint sensing system as recited in claim 1 to verify the identity of its user.

27. A recording device comprising a fingerprint sensing system as recited in claim 1 to record the identity of its user.

28. A fingerprint sensing system comprising:
   a sensing surface,
   a transparent substrate;
   a plurality of rigid prismlets coupled to the transparent substrate, the prismlets positioned opposite to the sensing surface and forming a first sheet prism;
   a detector array;
   a lens to focus the radiation emitted from the exit surfaces to the detector array, and to de-magnify the image to be captured by the detector array;
   an optical system with mirrors to fold the emitted radiation so as to change the ratio between the maximum length and maximum width of the sensing system and mirrors on both the top and the bottom surfaces to reflect the emitted radiation;
   wherein use of the sheet prism and the mirrors in the optical system substantially reduce a height of the finger print system.

* * * * *

Adverse Decision In Interference

Patent No. 5,796,858, Gan Zhou, Yong Qiao, Fai Mok, FINGERPRINT SENSING SYSTEM USING A SHEET PRISM, Interference No. 104,649, final judgment adverse to the patentees rendered May 14, 2002, as to claims 1-10 and 18-27.

*(Official Gazette July 29, 2003)*